Nov. 12, 1935. G. F. LUNDQVIST 2,021,071

SEMIAUTOMATIC GEAR

Filed March 3, 1934 3 Sheets-Sheet 1

G. F. Lundqvist
INVENTOR

By: Marks & Clerk
ATTYS.

Nov. 12, 1935. G. F. LUNDQVIST 2,021,071
SEMIAUTOMATIC GEAR
Filed March 3, 1934 3 Sheets-Sheet 2

G. F. Lundqvist
INVENTOR

By Marks & Clerk
ATTYS.

Nov. 12, 1935.     G. F. LUNDQVIST     2,021,071
SEMIAUTOMATIC GEAR
Filed March 3, 1934     3 Sheets-Sheet 3
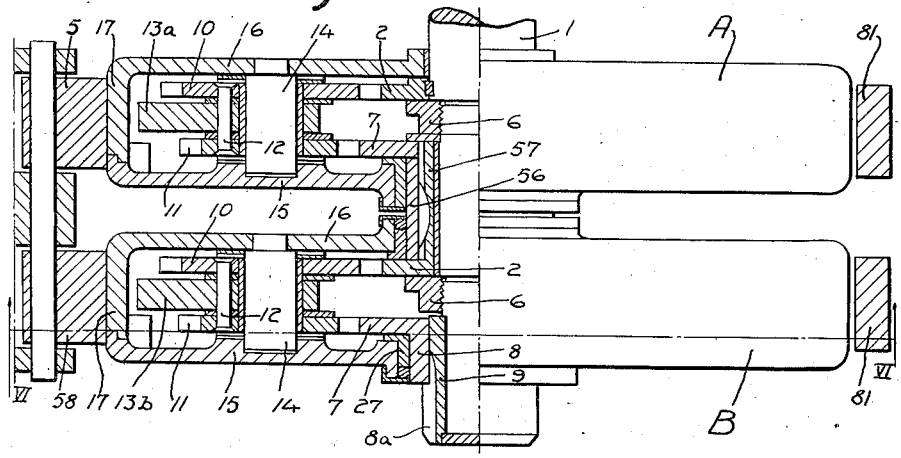
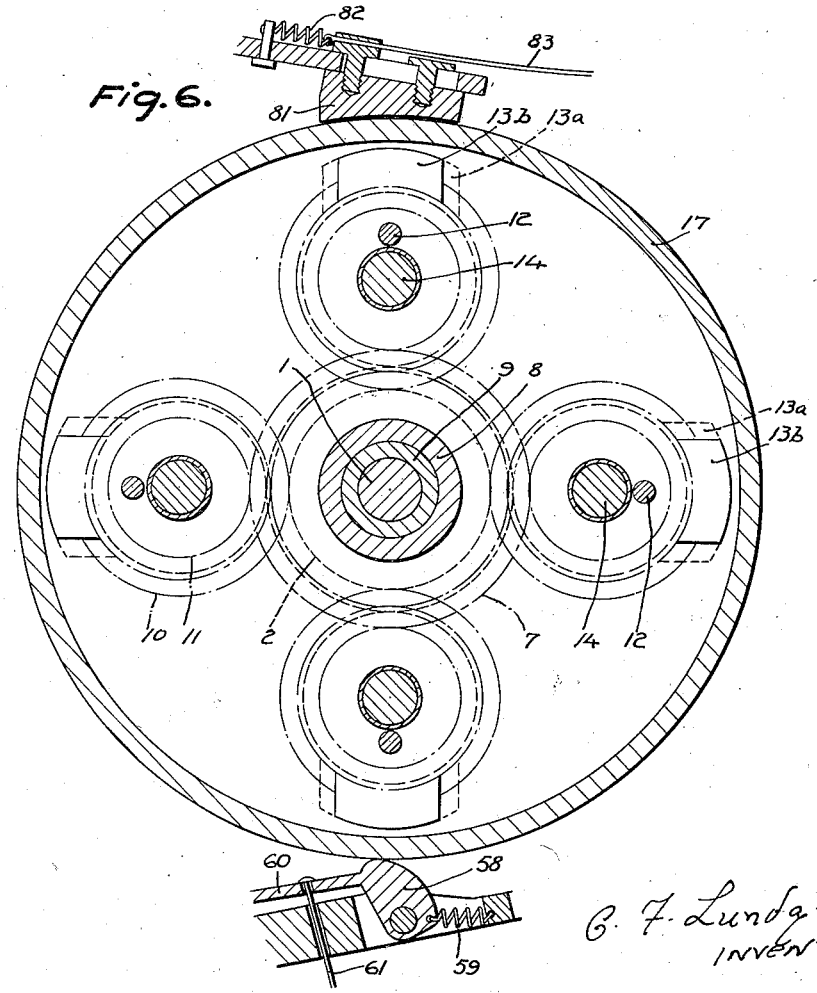
G. F. Lundqvist
INVENTOR
By: Marks & Clerk
ATT'YS.

Patented Nov. 12, 1935

2,021,071

UNITED STATES PATENT OFFICE 2,021,071

SEMIAUTOMATIC GEAR

Gunnar Fredrik Lundqvist, Stockholm, Sweden

Application March 3, 1934, Serial No. 713,919
In Sweden March 11, 1933

13 Claims. (Cl. 74—260)

The present invention relates to an automatic motion transmitting or change speed gear device between shafts, by means of which the rotation of the driving shaft may be transmitted to the driven shaft either by means of the elements of the gearing (reduction of the speed of the driven shaft relatively to the driving shaft) or directly, and by which the transition from one step to the other may take place automatically and smoothly. The invention may be used for power transmission between shafts in general from an optional source of power, but is specially intended to be used in motor-driven vehicles, specially in so-called light motor bi-cycles.

More particularly the object of this invention consists in an automatically operating synchronous gear, characterized by a planetary gear aggregate disposed between the driving and the driven shaft, which effects a reduction of speed from the driving shaft to the driven shaft, and the planet wheels of which are journalled in a casing or a cover rotatable about the said shafts, the said casing or cover being by ratchets prevented from rotating until a change has been provoked in the speeds of the two shafts relatively to each other towards synchronism. As long as the casing is prevented from turning transmission of motion takes place through the driving gears by means of gearing, and when the driving and the driven shaft under gearing variations have got the same speed, by means of direct coupling. In such a case the casing by the planet wheels has been entrained in the rotation in the direction of rotation of the main shafts, and gear and driving shaft rotate as a unit about a common shaft.

Moreover, in accordance with the invention provisions have been made to secure in the last mentioned case the planet wheels against rotation about their shafts, besides which the invention relates to specially advantageous embodiments of blocking means for the casing.

According to the invention also two coupling aggregates, which are connected with each other, may be provided for the power transmission between the driving shaft and the driven shaft, so that a greater number of gearing steps may be obtained.

The invention may also be modified by having the planet wheels journalled in a member which is rigidly connected with the driving shaft, and that the driving pinion of the gear may rotate about the shaft and be arranged to be blocked and braked instead of the casing. Furthermore, according to the invention the planetary gear is preferably releasably connected with the driving shaft so as to make it possible to disconnect and connect respectively the source of power or to make it easier to start the same, etcetera.

These and other characteristics of the invention will appear from the accompanying drawings, in which embodiments of the gear according to the invention are shown as examples.

Figure 2:
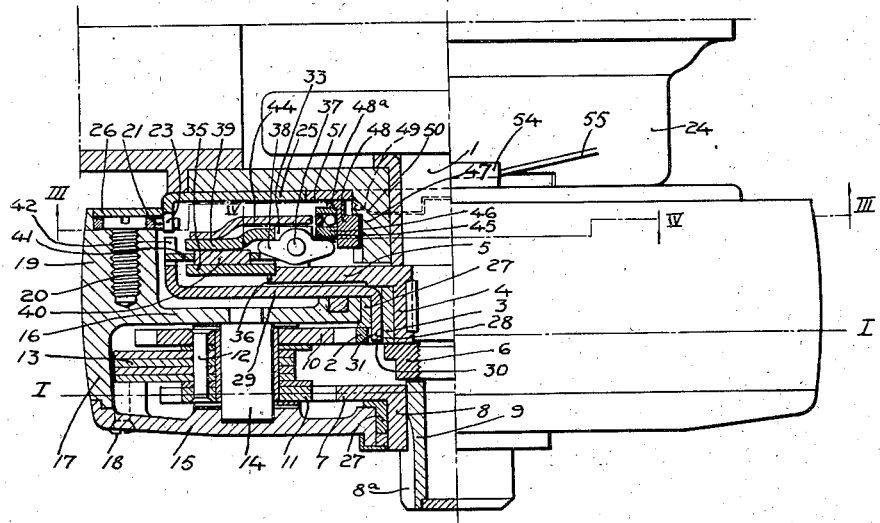
Figure 3:
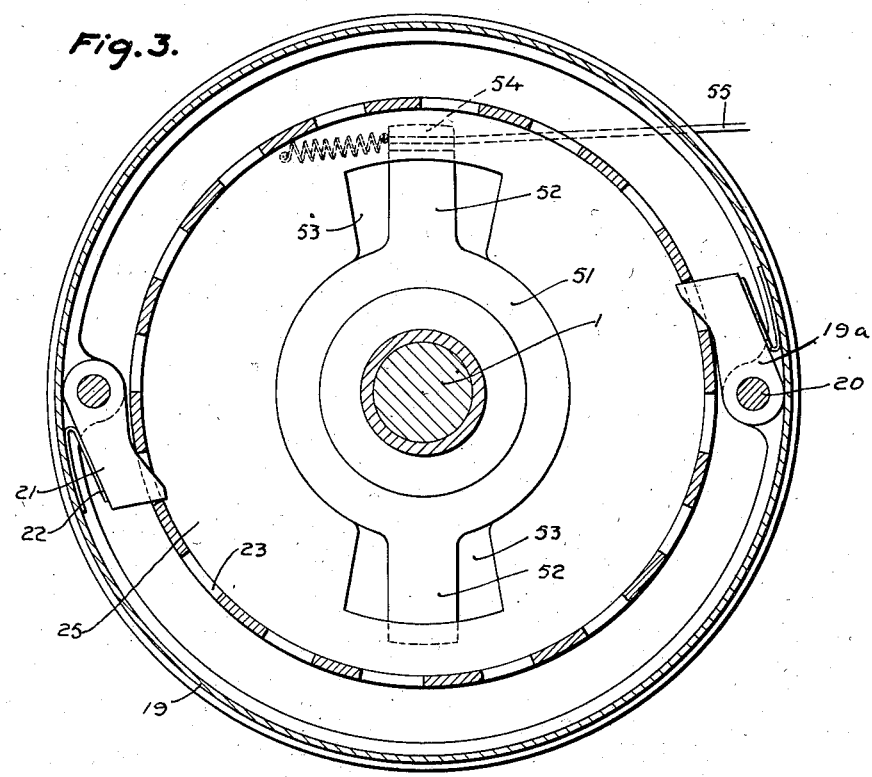
Figure 3 shows a section along line III—III.
Figure 4:
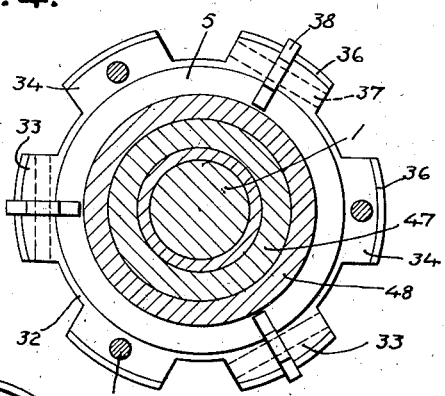

Figure 4, a section taken on line IV—IV of Figure 2.

Figure 1:
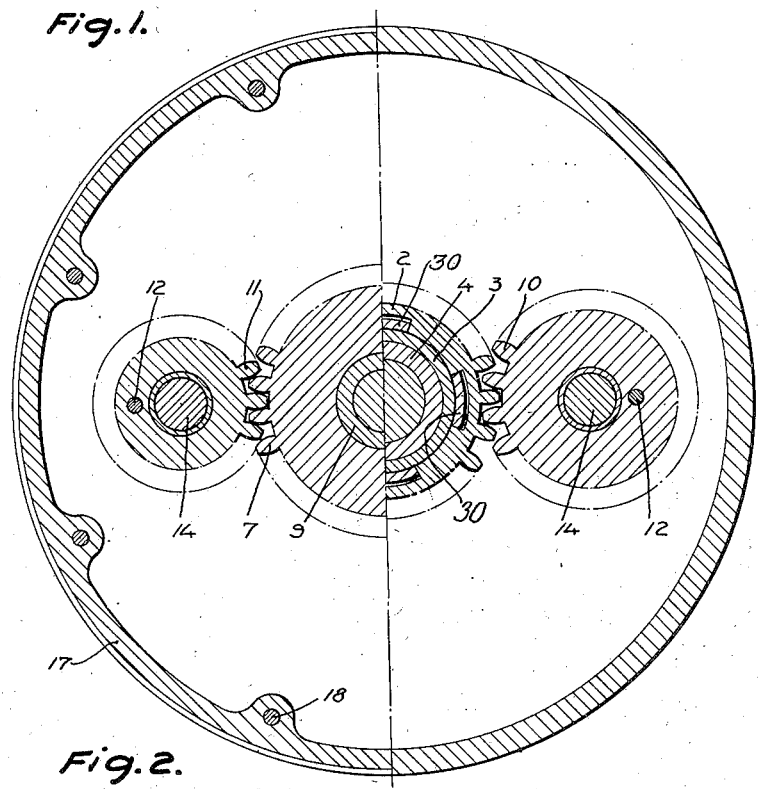
Figures 1 and 2 show an example, Figure 1 being taken along the line I—I of Figure 2, the latter being a diametrical cross section through the gear with appertaining clutch disposed in a motor vehicle between motor and the driven shaft.

Figure 5 shows two gear aggregates substantially in accordance with Figure 1 (yet without clutch), united in one unit, also in diametrical cross section, and Figure 6, a section along line VI—VI of Figure 5.

Figure 7:
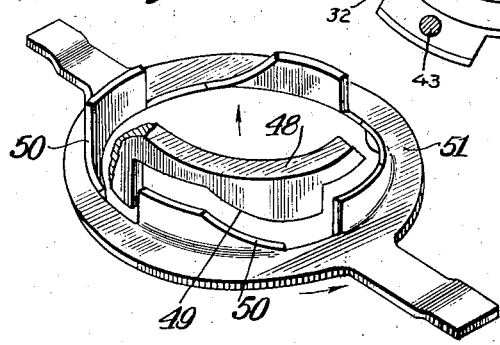

Figure 7 is a perspective view showing a detail of the clutch control.

The same reference numerals have been used for indicating corresponding parts in all of the figures.

According to Figures 1-4, which show the planetary gear constructed as a two-step gear and a device for disengaging the same, a driving pinion or sun wheel 2, is with its hub 3 rotatably journalled on the hub 4 of a disc 5, which forms part of the disengaging device, the clutch, and is more particularly described below, the said hub 4 being keyed or secured in some similar way on the driving (the motor-) shaft 1. A stopping- or safety nut 6 retains the said members in their positions. With its hub 8 the driven larger sun wheel 7 is rotatably provided on a bushing 9 on the end or tap of the shaft 1, the said end being formed with a reduced diameter. The hub 8 may be formed so as to be connected with the shaft which is to be driven. It may for example be provided with or be shaped to a chain wheel 8a for a chain or other transmission in connection with the said shaft. If the driving and the driven shafts are co-axial the transmission may take place for instance by means of a coupling flange or the like. Planet wheels 10 and 11 respectively of two groups of planet wheels (more such groups may be provided) are in engagement with the sun wheels 2 and 7 respectively, of which former wheels the wheel 10 of each group has a larger diameter than the wheel 11. By means of one or more bolts 12 wheels 10 and 11 are connected with each other and with an eccentric body 13 provided between them and consisting of discs. Each group of planet wheels, which is composed in such a manner, is rotatable about an axle end 14, which is stationarily provided in the front and rear walls 15 and 16 respectively of the gear casing or drum. The wall or bottom portion 16 has an outwardly directed flange 17, forming the end of the casing, in which the wall or the cover portion 15 is secured by means of screws 18, screwed into ears on the end portion, or is secured in another way, and an inwardly directed annular flange 19, which surrounds the clutch and in which are catches or pawls 21 diametrically journalled on bolts 20 threaded into ears 19a, the said catches or pawls preferably being weight loaded at their ends and each of them being actuated by a relatively weak spring 22 to be moved inwards to engagement with one of the teeth 23 on a ratchet wheel 25 which is secured on the motor case, crank case, 24. The pawls thus prevent the anti-clockwise motion of the casing, but allow its motion in the opposite direction. At clockwise rotation of the casing the pawls are swung by the centrifugal force in such a way that they do not drag on the ratchet wheel but gradually against the action of the spring 22 are brought to rest against the wall of the casing. The number of pawls may vary. On the flange 19 there is threaded a covering plate 26, which is located between the flange and the ratchet wheel.

The casing is rotatably journalled in bushings 27 on the wheel hub 8 and on a flange 28 of a driving plate 29 for the clutch respectively. The flange has claws or projections 30 engaging recesses 31 in the wheel 2, whereby the disc 29 thus is positively connected with the said wheel.

The eccentric bodies 13 serve as centrifugal weights.

The above mentioned disc 5, which forms part of the clutch, is provided with a rearwardly directed guiding- and journalling flange 32, see especially Figure 4, on its circumference which flange is provided with a number of symmetrically disposed radial extensions or ears 33 and 34. In the embodiment shown there are six of them, having alternately a somewhat differing shape. Over the flange is pushed a coupling disc 35, which is blocked against axial displacement outwards by edge flanges 36 on the ears. In each of the projections 33 there is rotatably mounted on a tap 37, a two-armed lever or rocking- (tappet-) lever 38, which when seen from the driving shaft rests with its outer end against a second coupling disc 39, which is displaceably disposed on the backward directed flange portion of the disc 5. Between the discs 35 and 39 there is loosely provided a driving plate 40, which by means of claws or projections 41 provided on its periphery is in engagement with the inwardly directed ratchet wheel 42 on the disc 29. On the outer portion of the driving plate 40 there is provided cork or other coating having a high coefficient of friction. On the other three ears, 34, there is retained, by means of bolts 43, Figure 4, a slotted, resilient disc 44, which with its outer portion rests against the coupling disc 39.

The inner end of each rocking lever 38 is located in a recess 45 in a ring 46 which actuates said lever. Said ring 46 by means of an anti-friction axial bearing is rotatably journalled on a second ring 48, which is non-rotatably but displaceably disposed on the projecting portion 47 of the crank-case, the said ring 48 having an inner driving flange 48a for the ring 46 and oblique or toothed surfaces 49 on its inner side and is adapted to be actuated to axial displacement by means of an annular disc 51, see especially Figures 3 and 7, which is limitedly rotatably journalled on the said crank case portion and intended for controlling the clutch, the said disc being provided with corresponding oblique or toothed surfaces 50 on its outside. The said annular disc is provided with arms 52, which extend into recesses 53 on the blocking disc 25, the said recesses admitting of the turning movement of the disc 51, which movement is adapted for actuating the ring 48. One arm 52 is under the action of a spring and is provided with a seat 54 for a control wire 55, a Bowden cable or the like.

If, as is shown in Figure 2, the control disc 51 is in an unactuated position and the coupling disc 39 is actuated by the spring disc 44 to frictional engagement with the driving plate 40, which in its turn is in engagement with the disc 35, coupling takes place between the driving shaft 1 and the driven shaft (the hub) 8 over the sun wheel 2, the disc 29, the driving plate 40, coupling plate 35 and the driving disc 5.

When the motor is to be disengaged, the driving plate 51 is moved clockwise, so that the toothed surfaces thereof force the ring 48 and the ring 46 axially outwardly so much as corresponds to the extension of the guiding surface, whereby the rocket arm 38 is so actuated that the upper end thereof forces the disc 39 out of engagement with the driving plate 40 which thus alone, at rotation of the sun wheel 2, participates in the motion.

The clutch described is chosen only as an example and may be varied according to circumstances.

The gear functions as follows. After the starting of the motor and after the clutch has been engaged the shaft 1 rotates clockwise, and the planet wheel shafts 14 tend to move the gear casing in the opposite direction. This is counteracted by the ratchets 21, which engage the ratchet wheel 25. See Figure 3. The casing now being held stationary the motion from the driving shaft 1 to the hub 8 (and the driven shaft) will be transferred by the groups of planet wheels. On account of the gear ratios in the planetary gear the hub 8 will in such a case get a less speed, i. e. run with a less speed than the shaft 1; in other words a reduction of the speed of the driven shaft relatively to the driving shaft takes place.

On this gearing step the motor accelerates the vehicle to a certain speed. Direct coupling between the driving shaft and the driven shaft may now either be provoked by the speed of the driven shaft increasing relatively to that of the driving shaft in the ratio determined by the reduction in speed, for instance on a slope or the speed of the driving shaft may be reduced relatively to that of the driven shaft by momentarily choking or shutting off the gas supply to the motor and disconnecting the same respectively. If it is as in the last mentioned case also the wheel 10 of each group will rotate with a lower speed on account of the reduced speed. But the speed of the driven shaft being presumed to be constant, the casing will on account of the driving from the wheel 7 be brought along by the shafts of the planet wheels in the directon of rotation of the driving shaft, the wheels 10, 11, i. e. the groups of planet wheels beginning to wander (roll) about the center of the clutch so as to compensate the reduced speed. This clockwise motion of the casing may take place without the ratchets 21 preventing it, which swing outwards, and said motion of the casing increases, until the speed of the casing is equal to that of the driving shaft and therewith that of the driven shaft. In the meanwhile the rotation of the planet wheels about their own shafts has still more decreased and finally in the last mentioned position completely stopped. In this position the planet wheels couple directly the driving and driven shafts, the planet wheel weights are swung out and a considerable centrifugal moment is obtained on account of the speed of rotation of the whole system. Thus the whole system rotates as a unit. Small momentary oscillatory motions of the planet wheels about the shafts may of course occur.

Now, if the gas supply to the motor is let on or increased and if the same is engaged the motor drives the vehicle on direct coupling. A condition for the above is that the centrifugal moment is sufficiently large so as to overcome the torsional moment, to which the planet wheels are subjected by the driving shaft. In other words the centrifugal weights must be so adapted that at the speed in question their centrifugal moment is equal to or larger than the above mentioned moment of torsion.

As mentioned the transition to direct coupling takes place in a corresponding way, if the speed of the driven shaft and therewith that of the hub 8 get an increase relatively to the shaft 1. The increase of speed, which the hub 8 in such a case tries to impart to the planet wheel 11, but which the wheel 10 cannot transmit to the wheel 2 and the shaft 1, also provokes so to speak a compensating motion of the planet wheels. As mentioned above the said wheels are forced into a rolling motion about the center of the coupling, taking the casing with them. For the rest the course is similar to that above mentioned.

If during the working with direct coupling the motor is subjected to overload or the driven shaft and the hub 8 begin to run with a lower speed, the resistance of the same is increased and the speed of the motor will decrease.

When the speed of the motor has become so low that the torsional moment of the centrifugal force is overcome by the torsional moment exerted by the motor shaft, the groups of the planet wheels begin to rotate. They are not able to maintain their resting positions on the shafts. Hence the motor becomes completely unloaded and the speed of it accelerates, simultaneously with the motion of the casing decreasing and finally, when the motor has reached the right speed for the working with reduction in speed, the casing becomes immovable. Anti-clockwise turning is prevented by the ratchets 21, which are now swung inwards and engage the ratchet wheel 25. The transition from direct coupling to reduction in speed, driving by way of the planet, thus cannot take place completely synchronously without using clutches.

Generally speaking in a gear according to the invention, which is disposed between a driving and a driven shaft, the transition from working with reduction of speed to direct coupling is attained through establishing in the gear ratio correspondence in speed between the two shafts, and this may take place either by imparting a lower speed to the driving shaft or by imparting a higher speed to the driven shaft relatively to the other shaft. And reversedly transition to reduction in speed from direct coupling is obtained by increasing the resistance and reducing the speed respectively of the driven shaft or increasing the speed of the driving shaft, until the relative speed ratio between the shafts, which is intended for the gear, has been obtained. All of the transitions take place smoothly and automatically.

The use of the clutch may preferably be illustrated as an example in the case, in which the gear is disposed on a so-called light motor-bicycle with power transmission to the shaft of the pinion. The clutch is operated by means of the control wire 55, so that the motor shaft is disconnected from the planetary gear. Now, if the driver enters the cycle and starts the same by treading, the driven wheel 7 of the gear is brought into rotation, in which the whole gear box and parts of the clutch, which are connected with the pinion 2, are caused to participate according as the inertia of the mass is overcome. If now, after the cycle and the gear case respectively have attained the speed required, the motor shaft is connected, a braking of the speed of the pinion 2 is provoked simultaneously with the reaction force accelerating the case clockwise up to a speed, the ratio of which relatively to the speed of the pinion 7 is determined by the gear ratio in the gear. It is evident that the acceleration power is equal to the starting resistance of the motor and is most considerable during the first revolution of the motor. Insofar as the motor after the start by its own force accelerates in speed, the casing retards, until casing, motor shaft and the wheel 7 get the same speed relatively to each other, when direct coupling takes place. If, as has been previously pointed out, in such a case the centrifugal moment of the centrifugal weights is as great as or greater than the moment exerted on the planet wheel by the motor, the motor continues driving on direct coupling. Otherwise the motor continues accelerating at the same time as the casing retards, until the speed of the casing is equal to naught. Its tendency to accelerate clock-wise is prevented by the catch 21 and the motor drives with reduction in speed, as has been explained before.

If during the run one wishes to pass from direct coupling to gearing, independently of the automatic action, this is effected by momentarily disconnecting the motor shaft, the living force at the increase of the speed being added to the torsional moment of the motor, whereby the centrifugal moment of the centrifugal weights is overcome.

It should be observed that the axial forces, which actuate the clutch, when the cycle is adjusted for tread-driving, for example before the start, have their application points exclusively on stationary parts, so that the least frictional resistance possible is obtained.

Figures 5 and 6 illustrate the invention when applied in an aggregate without the use of a clutch, comprising two gear elements A and B, each of them being substantially of the same construction as the coupling according to Figures 1 and 2, the said couplings working in series, or in other words a 3-step gear. In the example four groups of planet wheels are provided in each coupling. The eccentric body 13a of the aggregate A is, as can be seen, larger than the body 13b of the aggregate B; the centrifugal masses are so adapted that at a certain speed the ratio between the centrifugal moments on the centrifugal weights and the torsional moments, to which the planet wheels are subjected from the driving shaft, in the aggregate A is larger than the one of the aggregate B. If additional gears are used for example, one outside the aggregate B, the centrifugal weights of the same are so adapted that for a certain speed the ratio between the moments becomes smaller than the one of the aggregate B etcetera.

The wheel 2 of the aggregate A is secured on the shaft 1 by means of a key, the wheel 7 of the said aggregate being by means of a hub portion 56, which extends into the aggregate B, keyed on a similar hub 57 of the sun wheel 2 of the aggregate B, the said hub being rotatably journalled on the shaft 1. The casings for the aggregates are substantially alike and rotatable independently of one another on bushings on the shaft 1 and the hub portions 57 and 8 respectively.

Thus in the example two steps of reduction in speed are obtained, one with a lower and one with a higher gearing ratio.

The size ratios between the two sun wheels 2, 7 and the two planet wheels 10, 11 respectively relatively to each other may be different within each aggregate, whereby different gear ratios can be obtained in the aggregates.

A braking device is provided for each of the casings, the said braking device being in the drawings shown to be formed in the shape of a brake shoe or block 81, which is displaceable on a stationary base and which against the action of a spring 82 by means of a controlling device or wire 83 may be brought to rest against the casing. Possibly a common brake device may be provided for both of the casings. The brakes may also be made as cut open expansion rings, or otherwise, which rings may be pressed against the circumference of the casing. The ratchets for preventing the anti-clockwise rotation of the casing are in this case formed as members 58, which may be pressed against the circumference of the casing and which are swingably mounted in a stationary abutment and actuated by a spring 59 and which are adapted for remote control by means of an operating rope 61, wire or the like of a Bowden cable or the like, the said rope being secured to an arm 60.

The ratchets for the various casings may also be made according to Figures 1–4. They function and are operated by hand independently of one another both for blocking and releasing purposes. For the control of the same and of the braking means a common member may be provided, if desired.

The coupling device according to Figures 5 and 6 substantially functions in a corresponding way as the one shown in Figures 1–4, with the clutch connected. On starting the shaft 1 clockwise, i. e. in the direction, in which the gear casings are prevented from turning on account of the ratchet 58, the groups of the planet wheels of the various aggregates are thus successively brought into rotation, on account of which the motion of the shaft by way of the same is transmitted to the wheel 7 of the aggregate B and thereby via the chain wheel 8a to the shaft, which is to be driven. On account of the gear ratios the wheel 7 of the aggregate B will thus get a considerably smaller speed than the shaft 1.

If for some reason or other, for example on account of choking of the gas supply to the motor, the speed of the shaft 1 would be reduced relatively to that of the hub 8, the speed of the latter being presumed to be constant, the casing of aggregate A will be caused to rotate through the action of the planet wheels and the centrifugal weights will produce direct coupling so far as aggregate A is concerned.

Within aggregate A there is thus direct coupling, whereas in the aggregate B, the sun wheel 2 now has the same speed as the corresponding wheel of the aggregate A and coupling takes place by gearing, reduction in speed.

If the speed of the shaft 1 does not decrease further, these ratios are maintained within the aggregates, as the torsional moment of the centrifugal force is greater in the aggregate A than in the aggregate B, the centrifugal moment of which at the speed given still is overcome by the torsional moment exerted by the shaft 1 on the planet wheels. If, however, the speed of the shaft 1 further decreases or is further reduced, so that finally the wheel 2 of the aggregate B gets the same speed as the wheel 7 in the same aggregate, also in this aggregate the planet wheels on account of the centrifugal force will gradually stand still on the shafts and take with them the casing of this aggregate. The driving and driven shaft are thus now direct coupled. The course will be the same, if the speed of the driven shaft for some reason or other would, successively, be increased relatively to that of the driving shaft. If at the power transmission with direct coupling the motor is overloaded and the comparative resistance of the driven shaft is increased, transition to gearing takes place as described in connection with Figures 1–3, first in the aggregate B, as soon as the speed of the shaft 1 has been so reduced, that the torsional moment of the centrifugal force in the said aggregate is overcome by the torsional moment of the shaft 1, at which the aggregate A is still direct coupled, until the speed of the shaft 1 has decreased further so far, that also there the centrifugal force can no longer keep the planet wheels still, when reduction in speed takes place and the motor accelerates to the determined speed. The transition from and to the different steps thus takes place automatically and smoothly.

By means of the braking device one may, when required, prevent one or both casings from turning, for example on braking the motor; thus the brake may among other things be used for the same purpose as the clutch to provoke transition from direct coupling to gearing.

If a further coupling is provided a four-step gear is obtained, which operates in a corresponding way.

A clutch, similar to the previously described device or of another suitable kind, may be provided also in this case and by means of the same the whole gear aggregate may be disconnected from the motor shaft.

In the embodiments shown the gear is shown applied to transmission of power from a motor of a motor-vehicle, but the device may also be used in transmission of power between shafts in general from an optional source of power.

By the above described various arrangements a very simple and at the same time reliable gear is thus obtained, by means of which transition from various gearing steps may take place smoothly, without violent engagings and bumps, and automatically, possibly also by manual actuation. The gear may be constructed as a gear of two or more steps.

The above embodiments are only chosen as examples, and it is clear that as to the details the same may be varied in different ways, without the scope of the invention being abandoned.

Having now described my invention, what I claim as new and desire to secure by Letters Patent is:

1. In an automatically operating synchronous gear, one driving and one driven shaft, a planetary gear aggregate disposed between the said shafts, which effects reduction of the speed of the driven shaft relatively to the driving shaft, a casing for the gear, the said casing being rotatorily mounted about the shafts, the planet wheels in the gear being mounted in the said casing, said planet wheels being provided with centrifugal weights actuated by the centrifugal force so as to prevent the wheels from rotating about their shafts, after the driving and the driven shaft have the same speed and the casing has been entrained in the rotation, and means for interrupting the movement of the casing against turning until a change has been provoked between the speeds of the two shafts relatively to each other towards synchronism.

2. In an automatically operating synchronous gear, a sun wheel secured on a drive shaft, another sun wheel having a larger diameter than the first mentioned wheel and being connected with a driven shaft, a casing for the gear, rotatorily disposed on the said shafts, shafts stationarily disposed in the casing, groups of planet wheels rotatably disposed in the said casing on the last mentioned shafts, one group on each shaft, each group consisting of two wheels, which are connected with each other and which have different diameters, the one having a larger diameter being in engagement with the smaller sun wheel, which is secured on the driving shaft, and the one having a smaller diameter on the other sun wheel, means for blocking the casing against rotation in one direction whereby it is possible to effect reduction of the speed of the driven shaft relatively to the driving shaft, and means for bringing the groups of the planet wheels to a stand still on their shafts upon the rotation of the casing in the opposite direction at change of the speeds of the driven and the driving shaft towards synchronism, said means comprising eccentric weights mounted to revolve about the driving and driven shafts with said wheels and so proportioned and arranged that the centrifugal moment received upon the rotation of the casing is at least equal to the torsional moment exerted on the planet wheels from the driving shaft when the driving and driven shafts have the same speed.

3. A synchronous gear as claimed in claim 2, in which the blocking means for the casing consists of a catch mechanism with a ratchet wheel stationarily mounted in the same, weight-loaded catches swingably disposed on the outside of the wall of the casing, and a spring actuating the catch, the said spring tending to bring it to engaging position.

4. A synchronous gear as claimed in claim 2, in which the means for keeping the planet wheels still on their shafts consists of an eccentric sheave disposed between the wheels and connected with the same, the said sheave serving as a centrifugal weight upon the rotation of the casing, the centrifugal moment received at the rotation being equal to or greater than the torsional moment exerted on the planet wheel from the driving shaft, when the main shafts have the same speed.

5. In an automatically operating synchronous gear, a plurality of planetary gear aggregates disposed between one driving and one driven shaft, each of the said aggregates comprising two sun wheels, the last sun wheel of each aggregate, when seen in direction of the power transmission, having a larger diameter than the other; planetwheels, always in engagement with the sun wheels, said wheels being composed of groups formed as centrifugal weights, in which the ratio between the centrifugal moment of the centrifugal weights and the driving moment on the planet wheels at a certain speed is greater in the aggregate next to the driving shaft, than in the following one, a casing surrounding each aggregate, the said casings being rotatably disposed on the shafts independently of one another, shafts secured in the said casings, on which the said groups of planet wheels are rotatably disposed, the sun wheel having the larger diameter and located in the aggregate which is located next to the driving shaft, being rigidly connected with the sun wheel of a smaller diameter in the following aggregate; means for blocking the casings of the various aggregates independently of each other against rotation in one direction, means for bringing the casings to stand still on their shafts at the rotation of the respective casing in the opposite direction, and means for reducing the speed of the casings and for completely interrupting their movement.

6. A synchronous gear as claimed in claim 5, in which the driving shaft is connected so as to be disengaged, with the driving pinion of the planetary gear aggregate.

7. A semi-automatic constant mesh reducing gear of planetary type comprising a driving sun wheel, a driven sun wheel, a carrier, an unbalanced set of stepped planet pinions mounted on said carrier between said sun wheels, and ratchet detent mechanism operative to prevent rotation of such carrier until a change toward synchronism has been provoked between the speeds of the driving and driven sun-wheels.

8. A reducing gear according to claim 1 in which the centrifugal weights are directly connected with the hub of said planet wheels to revolve about said driving shaft having their center of gravity beyond the axes of rotation of the wheels and so proportioned and arranged that at the lowest speed intended for transition from direct driving to gear driving the torsional moment about the planet wheel axes exerted by the centrifugal force due to the rotation of the rotatable element is at least equal to the torsional moment exerted on the planet wheels from the driving shaft during direct driving with the driving and driven parts running at the same speed.

9. A reducing gear according to claim 1, in which the means for interrupting the moment of the casing comprises a uni-directional stopping device allowing rotation in the other direction, and means for rendering said stopping device inoperative.

10. A reducing gear as claimed in claim 1, and manually operated means for braking said casing.

11. A synchronous gear as claimed in claim 1, in which the driving shaft is connected, so as to be disengaged, with the driving pinion of the planetary gear aggregate.

12. A synchronous gear as claimed in claim 2, in which the driving shaft is connected, so as to be disengaged, with the driving pinion of the planetary gear aggregate.

13. A reducing gear according to claim 2, in which the means for interrupting the moment of the casing comprises a uni-directional stopping device allowing rotation in the other direction, and means for rendering said stopping device inoperative.

GUNNAR FREDRIK LUNDQVIST.